May 31, 1960                    C. H. ALLEN                    2,938,538
                            FLOW REGULATING VALVE
                            Filed Aug. 16, 1956
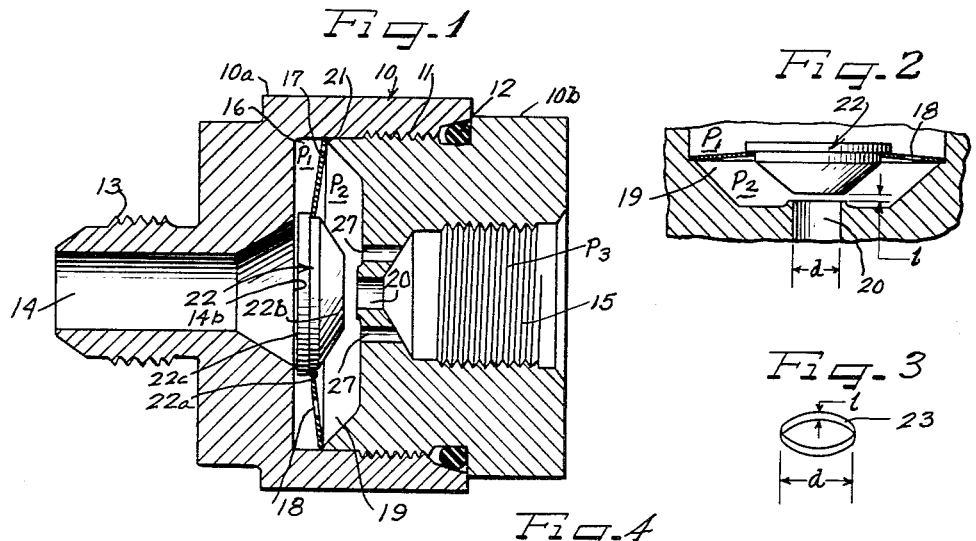
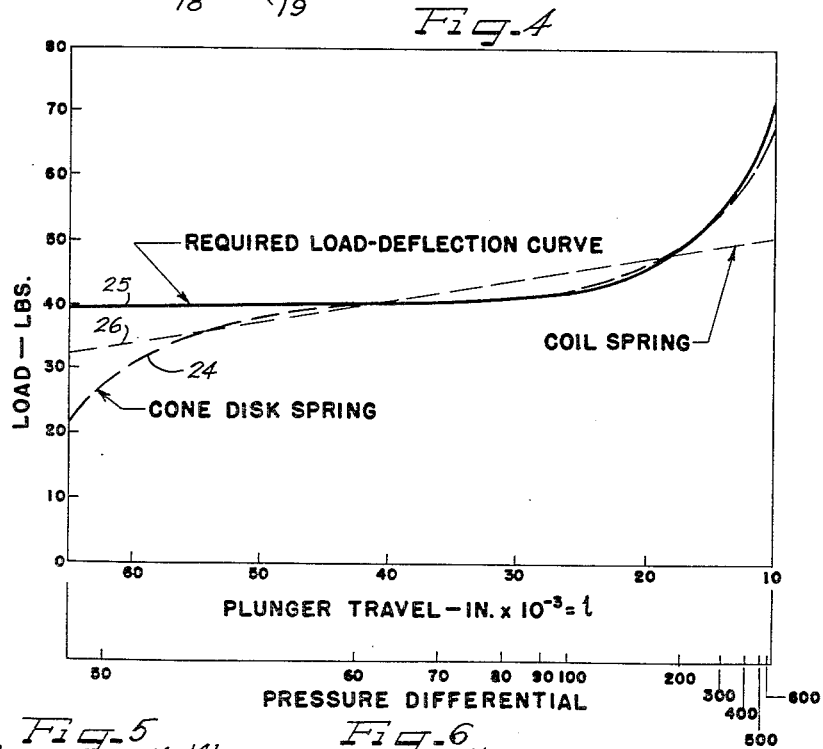
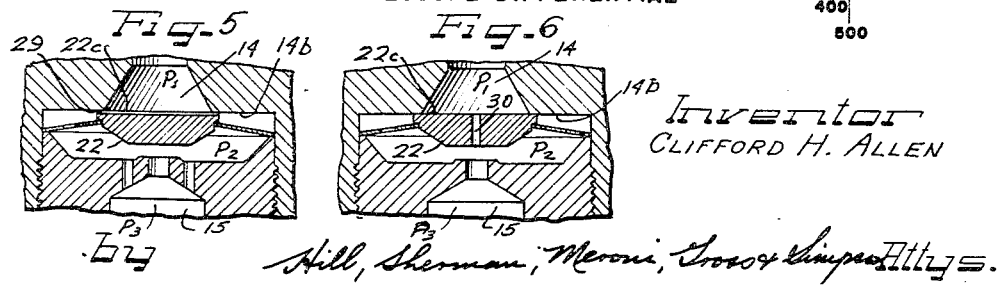
Inventor
CLIFFORD H. ALLEN

# United States Patent Office 2,938,538
Patented May 31, 1960

2,938,538

FLOW REGULATING VALVE

Clifford H. Allen, Cleveland, Ohio, assignor to Thompson Ramo Wooldridge Inc., a corporation of Ohio Filed Aug. 16, 1956, Ser. No. 604,547

11 Claims. (Cl. 137—504)

This invention relates in general to an apparatus for controlling fluid flow, and more particularly to a hydraulic system flow regulator primarily useful as a parasite load speed control in turbine-driven hydraulic pump systems, although other uses and purposes may be apparent to one skilled in the art.

The regulator of the instant invention, when employed in connection with turbine-driven hydraulic pump systems, serves to maintain relatively constant turbine speed in spite of changes in load downstream from the pump by adjusting a regulating orifice for constant flow at varying system pressure differentials. In this instance, the pump is a positive displacement type of pump such that the flow is directly proportional to pump speed. More generally, the hydraulic system flow regulator of this invention will function as an efficient, low cost flow regulating valve for a wide variety of hydraulic systems.

Further, in association with turbine-driven hydraulic pump systems, the flow regulator of the present invention serves as a check valve to prevent motoring of the pump and turbine in the event of high pressure differentials in the reverse direction. In this particular application, the check valve has a fixed orifice so that some reverse flow is permitted for system check out procedures, but this flow is considerably less than flow in the normal direction.

In the present invention, fluid enters an inlet port that passes into a reference chamber. The fluid then flows through one or more fixed orifices drilled in a cone disk spring which defines one wall of the reference chamber, and from here flows into a pressure chamber. From the pressure chamber, the fluid passes through a regulating orifice and out through a discharge port. A valve plunger is carried on the cone disk spring which coacts with the regulating orifice and responds to the movement of the cone disk spring for controlling the regulating orifice area and the fluid flow through the valve. By this unique arrangement, the cone disk spring load-deflection characteristics are utilized as a substitute for pressure balancing. Therefore, the advantages of pressure balancing are enjoyed without the costly arrangements usually employed for this purpose in regulating valves which use the more conventional coil spring design.

Accordingly, it is an object of this invention to provide an improved hydraulic system flow regulator that will function as an efficient, low cost flow regulating valve for a wide variety of hydraulic systems.

Another object of this invention is to provide a hydraulic system flow regulator for use in connection with turbine-driven hydraulic pump systems that serves to maintain relatively constant turbine speed in spite of changes in the load downstream from the pump.

A further object of this invention resides in the provision of a flow regulator employed for use with a turbine-driven hydraulic pump system, wherein the regulator serves as a check valve to prevent motoring of the pump and turbine in the event of high pressure differentials in the reverse direction.

Another object of this invention is in the provision of a fluid flow regulator for hydraulic systems, wherein the advantages of pressure balancing are enjoyed without the costly arrangements usually employed for this purpose in regulating valves which use the more conventional coil spring designs.

Still another object of this invention is to provide a hydraulic system flow regulator that eliminates sliding surfaces and sliding seals.

A still further object of this invention is to provide a hydraulic system flow regulator which includes a cone disk spring having spring load-deflection characteristics that are utilized to substitute for pressure balancing.

A still further object of this invention resides in the provision of a hydraulic system flow regulator including a cone disk spring carrying a valve plunger which coacts with the regulating orifice, wherein the cone disk spring provides the proper spring load characteristics, functions as a diaphragm, provides a fixed orifice and retains the valve plunger.

Other objects, features, and advantages of the invention will be apparent from the following detailed disclosure, taken in conjunction with the accompanying sheets of drawings, wherein like reference numerals refer to like parts, in which:

On the drawings:

Figure 1 is an axial sectional view, with some parts in elevation, of a hydraulic system flow regulator according to the invention;

Figure 2 is a fragmentary, detailed sectional view of a portion of the valve in Figure 1 for the purpose of illustrating more or less diagrammatically the dimensions of the regulating orifice area;

Figure 3 is a perspective view illustrating the shape of the regulating orifice area of the valve according to the invention;

Figure 4 is a graphic illustration of comparative load-deflection curves employed for illustrating the advantages of the instant invention;

Figure 5 is a fragmentary, detailed sectional view similar to Figure 2 but illustrating a modified form; and Figure 6 is a fragmentary detailed sectional view similar to Figures 2 and 5 but illustrating another modified form.

As shown on the drawings:

Referring particularly to Figure 1, the hydraulic system flow regulator of the present invention includes a sectional housing or casing 10 having sections 10a and 10b. Section 10a is more or less cup-shaped and internally threaded at 11 to receive an externally threaded portion of the casing section 10b. Casing sections 10a and 10b are assembled with an O-ring seal 12 for preventing external leakage.

Extending centrally from the closed end of the casing section 10a is a fitting 13 that is centrally bored to define an inlet or inlet port 14. Casing section 10b is generally in the form of a solid cylinder which is centrally bored partially through one end to define an outlet or discharge port 15.

Fluid enters the inlet port 14 and passes into a reference chamber 16 having a pressure $P_1$. This reference chamber is defined by the casing 10a and a cone disk spring 17. The fluid then passes through one or more fixed orifices 18 provided in the cone disk spring, and into a pressure chamber 19 having a pressure $P_2$. The pressure chamber 19 is defined on one side by the cone disk spring 17 and the other side by a hollow portion in the adjacent end of the casing section 10b. From the pressure chamber 19, the fluid flows through a regulating orifice 20 and out through the discharge port 15.

The outer periphery of the cone disk spring 17 is seated on a shoulder 21 defined by an inwardly extending annular portion of the casing section 10b and the adjacent wall of the casing section 10a. The cone disk spring is centrally apertured and receives on its inner periphery a shoulder 22a of a valve plunger 22 that is provided with a rearwardly extending frusto-conical portion 22b coacting with the inlet end of the regulating orifice 20. The cone disk spring 17 urges the valve plunger 22 away from the regulating orifice 20 increasing the regulating orifice area and decreasing the pressure differential between the pressure chamber 19 and at the discharge port 15. Hereinafter, the pressure at the outlet 15 will be designated as $P_3$.

The cone disk spring 17 further serves as a flexible partition or diaphragm between the reference chamber 16 and the pressure chamber 19; and the pressure differential between these chambers acts upon the cone disk spring in opposition to its compressive spring load and urges the valve plunger 22 toward the regulating orifice 20, thereby decreasing the area of this orifice and increasing the pressure differential between the pressure chamber 19 and the discharge port 15 which decreases the pressure differential between the reference chamber 16 and the pressure chamber 19. Thus, it is seen that the rate of flow through the fixed orifice 18 depends upon the pressure differential between the chambers, and the same pressure differential will determine the position of the cone disk spring and valve plunger.

If an increase occurs in the value of $P_1-P_3$ this will cause an increase in the values of $P_1-P_2$ and $P_2-P_3$. However, the cone disk spring 17 will react immediately to an increase in $P_1-P_2$ and move the valve plunger 22 toward the regulating orifice 20. The resulting decrease in orifice area will increase the pressure differential $P_2-P_3$ so that the major portion of the change in pressure differential $P_1-P_3$ is equalized by the change in $P_2-P_3$ and the only change in $P_1-P_2$ will be due to the change in load resulting from the deflection of the cone disk spring. Thus, it is seen that a change in the pressure differential $P_1-P_2$ is a function of the spring load-deflection rate and the distance which the spring must deflect to correct the regulating orifice flow area so that the change in $P_2-P_3$ will account for the greatest portion of the change in $P_1-P_3$.

It is then obvious that if the rate of change in $P_1-P_2$ is much less than the rate of change in $P_2-P_3$ then the major portion of the change in $P_1-P_3$ will occur at the regulating orifice, or in the value of $P_2-P_3$, and the value of $P_1-P_2$ will then remain relatively constant.

This desired relationship is accomplished by using a cone disk spring having a low deflection rate value and also by reducing the value of the spring deflection. Knowing the desired flow rate, the properties of the fluid and the overall pressure differentials involved, the value of the spring deflection can be kept at a minimum by using a regulating orifice circumference of sufficient value so that the maximum travel of the plunger is kept small. In Figure 2, the measured length of the valve plunger travel is measured by $l$, and the diameter of the regulating orifice 20 is indicated by $d$. In Figure 3, the shape of the regulating orifice area is indicated by the numeral 23, this shape approximating that of a disk or cylinder.

In order to keep the value of $l$ at a desirably low value, it is seen that the value of $d$ must be made correspondingly high so that the total flow area is the same. This, however, exposes a large area in the center of the plunger to the pressure differential $P_1-P_3$ which value is subject to large variations and which consequently unbalances the loads acting on the valve plunger, causing relatively large variations in regulated flow. It has been the practice in conventional flow regulators to utilize somewhat complicated schemes for pressure balancing this effect on the valve plunger.

A typical load-deflection curve, as seen in Figure 4, for a cone disk spring operating under conditions of high flow, large variations in pressure differential $P_1-P_3$ and low values for $l$ illustrates a further advantage of the cone disk spring over a conventional coil spring.

By selecting the proper height/thickness ratio for the cone disk spring, a load-deflection characteristic, as indicated by the dashed line 24, can be obtained which closely approximates the required load-deflection characteristics for perfect regulation, as indicated by the solid line 25. It is obvious that this curved line 24 meets the requirement much more satisfactorily than does the straight-line relationship shown for a coil spring in broken line 26. Plotted along the vertical axis in the graph of Figure 4 is the compressive load on the spring, while the pressure differential across the valve and the distance of plunger travel is plotted along the horizontal axis.

The straight-line portion of the load-deflection curve 24 serves to allow considerable deflection with very little change in compressive load at the lower pressure differential values where this characteristic is required. Further, the rapidly increasing load-deflection rate as deflection becomes greater then serves to provide the relatively large increases in compressive load with relatively lower changes in deflection which are required at the higher pressure differential values.

If the pressure differential $P_1-P_3$ were to increase suddenly as a result of pressure surge to the hydraulic system, the regulating orifice may be momentarily reduced to zero as a result of the fluid inertia, since the inertia would create a reaction in the same direction as the valve plunger normally moves to reduce the regulating orifice area. If this situation happened to arise, a phenomenon, sometimes referred to as water hammer, might occur and cause damage to the hydraulic pump and turbine mechanisms.

In order to obviate this situation, one or more by-pass holes 27 are provided for intercommunicating the pressure chamber 19 and the discharge port 15 outside of the regulating orifice area for the purpose of allowing fluid to flow through the valve even though the regulating orifice is completely closed. The by-pass area is less than the total regulating orifice area required for the maximum pressure differential $P_1-P_3$ expected at normal service so this provision in no way interferes with normal regulation except to reduce somewhat the actual required value of the plunger valve travel. This reduction in the plunger valve travel represents an additional benefit of the by-pass holes inasmuch as the total deflection and likewise the maximum stress in the cone disk spring 17 is reduced by this amount.

Again referring to Figure 1, consider the condition wherein the value of the pressure differential $P_1-P_3$ is reversed. In this case the flow would enter the valve at discharge port 15 through the regulating orifice 20, fixed orifice 18 and out through the inlet port 14. Since the direction of flow is the same as the direction of spring loading, the valve plunger 22 will immediately move in the direction of flow until its forward surface 22c rests against casing surface 14b, thus shutting off the flow. This provides the check valve function previously mentioned.

If a groove or slot 29 is provided in the surface 22c of the valve plunger, thus spoiling the seal between the surfaces, a certain amount of backflow can be allowed, Figure 5, depending upon the dimensions of the groove. An alternate method of providing for backflow is to drill a hole 30 of the desired size through the center of the plunger, Figure 6. In the latter case this hole would also substitute for the by-pass function normally provided by the holes 27, Figure 1.

It will be understood that the flow regulating valve of the instant invention may be constructed to serve for an unlimited number of flow rates and for any given hydraulic system pressure by varying the area of the fixed orifice 18 and the value of the compressive load of the cone disk spring 17. Finer adjustments of flow rates may be accomplished by removing the valve plunger 22 and replacing it with one having a slightly different length.

From the foregoing, it is seen that the instant invention provides a flow regulator which utilizes a cone disk spring in reducing space, weight and cost savings.

It will be understood that modifications and variations may be effected without departing from the scope of the novel concepts of the present invention, but it is understood that this application is to be limited only by the scope of the appended claims.

I claim as my invention:

1. A flow regulator comprising a casing having an inlet and an outlet, a compartment in said casing, a flexible cone disk spring in said compartment dividing it into two chambers, openings in said disk, one of said chambers communicating with the inlet and the other chamber communicating with the outlet, an orifice between said last chamber and said outlet, and a plunger carried by said cone disk coacting with said orifice and responsive to the pressure differential between said chambers, said spring having a load-deflection characteristic of relatively small slope for low values of said pressure differential, which slope increases as a function of said pressure differential for values thereof above said low values.

2. A flow regulator comprising a casing having an inlet and an outlet, a reference chamber communicable with said inlet, a pressure chamber communicable with said outlet, a cone disk spring separating said chambers and having a plurality of openings therethrough intercommunicating same, a regulating orifice between said pressure chamber and said outlet, and means carried by said cone disk spring coacting with said orifice to regulate flow therethrough, whereby flow through said regulator is determined by the pressure differential between said chambers, said spring having a load-deflection characteristic of relatively small slope for low values of said pressure differential, which slope increases as a function of said pressure differential for values thereof above said low values.

3. A flow regulator comprising a casing having an inlet and an outlet, a reference chamber communicable with said inlet, a pressure chamber communicable with said outlet, a cone disk spring separating said chambers and having a plurality of openings therethrough intercommunicating same, a regulating orifice between said pressure chamber and said outlet, and means carried by said cone disk spring coacting with said orifice to regulate flow therethrough in response to the pressure differential between said chambers, said cone disk spring having a load-deflection characteristic of relatively small slope for low values of said pressure differential, which slope increases as a function of said pressure differential for values thereof above said low values, and means between said pressure chamber and said outlet for preventing surging through said regulator.

4. A flow regulator comprising a casing having an inlet and an outlet, a reference chamber communicable with said inlet, a pressure chamber communicable with said outlet, a cone disk spring separating said chambers and having a plurality of openings therethrough intercommunicating same, a regulating orifice between said pressure chamber and said outlet, means carried by said cone disk spring coacting with said orifice to regulate flow therethrough, and bypass orifices between said pressure chamber and said outlet having an area less than the total regulating orifice area required for the maximum pressure differential across the regulator, whereby normal flow through said regulator is dictated by the pressure differential between said chambers and the spring load-deflection characteristic which is of relatively small slope for low values of said pressure differential, which slope increases as a function of said pressure differential for values thereof above said low values.

5. A flow regulator valve comprising a casing having an inlet port and a discharge port, a compartment in said casing, a cone disk spring having its outer periphery bearing against an annular shoulder in said compartment and dividing said compartment into a pair of chambers, one of said chambers communicating with said inlet port and said other chamber communicating with said discharge port, an aperture in said spring defining a fixed orifice between said chambers, a regulating orifice between said other chamber and said discharge port, and a valve plunger carried by said cone disk spring having a frusto-conical portion extending toward said regulating orifice and in the direction of the compressive loading of said spring, the very end of said frusto-conical portion coacting with said regulating orifice for controlling the effective area thereof, said spring having a load-deflection characteristic of relatively small slope for low values of the pressure differential between said chambers, which slope increases as a function of said pressure differential for values thereof above said low values, whereby the pressurized flow at the discharge port is maintained relatively constant regardless of the pressure at the inlet port.

6. A flow regulator valve comprising a casing having an inlet port and a discharge port, a compartment in said casing, a cone disk spring having its outer periphery bearing against an annular shoulder in said compartment and dividing said compartment into a pair of chambers, one of said chambers communicating with said inlet port and said other chamber communicating with said discharge port, an aperture in said spring defining a fixed orifice between said chambers, a regulating orifice between said other chamber and said discharge port, a valve plunger carried by said cone disk spring having a frusto-conical portion extending toward said regulating orifice and in the direction of the compressive loading of said spring, the very end of said frusto-conical portion coacting with said regulating orifice for controlling the effective area thereof, said spring having a load-deflection characteristic of relatively small slope for low values of the pressure differential between sad chambers, which slope increases as a function of said pressure differential for values thereof above said low values, and means between said other chamber and said discharge port for preventing surging in said valve, whereby the pressurized flow at the discharge port is maintained relatively constant regardless of the pressure at the inlet port.

7. A flow regulator valve comprising a casing having an inlet port and a discharge port, a compartment in said casing, a cone disk spring having its outer periphery bearing against an annular shoulder in said compartment and dividing said compartment into a pair of chambers, one of said chambers communicating with said inlet port, and said other chamber communicating with said discharge port, an aperture in said spring defining a fixed orifice between said chambers, a regulating orifice between said other chamber and said discharge port, a valve plunger carried by said cone disk spring having a frusto-conical portion extending toward said regulating orifice and in the direction of the compressive loading of said spring, the very end of said frusto-conical portion coacting with said regulating orifice for controlling the effective area thereof, said spring having a load-deflection characteristic of relatively small slope for low values of the pressure differential between said chambers, which slope increases as a function of said pressure differential for values thereof above said low values, a plurality of by-pass holes intercommunicating said other chamber and said discharge port outside of said regulating orifice for preventing surging in said valve, whereby the pressurized flow at the discharge port is maintained relatively constant regardless of the pressure at the inlet port.

8. A flow regulator valve comprising a casing having an inlet port and a discharge port, a compartment in said casing, a cone disk spring having its outer periphery bearing against an annular shoulder in said compartment and dividing said compartment into a pair of chambers, one of said chambers communicating with said inlet port, and said other chamber communicating with said discharge port, an aperture in said spring defining a fixed orifice between said chambers, a regulating orifice between said other chamber and said discharge port, a valve plunger carried by said cone disk spring having a frusto-conical portion extending toward said regulating orifice and in the direction of the compressive loading of said spring, the very end of said frusto-conical portion coacting with said regulating orifice for controlling the effective area thereof, said spring having a load-deflection characteristic of relatively small slope for low values of the pressure differential between said chambers, which slope increases as a function of said pressure differential for values thereof above said low values, a plurality of by-pass holes intercommunicating said other chamber and said discharge port outside of said regulating orifice for preventing surging in said valve, the by-pass area being less than the total orifice area, whereby the pressurized flow at the discharge port is maintained relatively constant regardless of the pressure at the inlet port.

9. A flow regulator comprising a casing having an inlet and an outlet, a compartment in said casing, a flexible cone disk in said compartment dividing it into two chambers, an opening communicating between the two chambers, one of said chambers communicating with the inlet and the other chamber communicating with the outlet, an orifice between said other chamber and said outlet, a plunger carried by said cone disk coacting with said orifice and responsive to the pressure differential between said chambers, the flexibility of said cone disk providing the sole restoring force for urging the plunger away from said orifice, a seat for said plunger in the first chamber, and a small passageway communicating between the inlet and said one chamber when the plunger is against said seat permitting a small controlled reverse flow.

10. A flow regulator comprising a casing having an inlet and an outlet, a compartment in said casing, a flexible cone disk in said compartment dividing it into two chambers, one of said chambers communicating with the inlet and the other chamber communicating with the outlet, an orifice between said other chamber and said outlet, a plunger carried by said cone disk coacting with said orifice and responsive to the pressure differential between said chambers, the flexibility of said cone disk providing the sole restoring force for urging the plunger away from said orifice, a seat for said plunger in the first chamber, and a passageway through the plunger.

11. A flow regulator comprising a casing having an inlet and an outlet, a compartment in said casing, a diaphragm formed of an elastic material in said compartment dividing it into two chambers, openings in said diaphragm, the first of said chambers communicating with the inlet and the other chamber communicating with the outlet, an orifice between said other chamber and said outlet, a plunger means carried with said diaphragm and spring biased away from said orifice solely by the elasticity of said diaphragm, said plunger means responsive to the pressure differential between said chambers, said plunger means facing both of said chambers, a seat for said plunger means in the first chamber and a valve surface for coacting with said plunger means in said other chamber to control flow through said orifice with changes in plunger position relative to said surface.

References Cited in the file of this patent

UNITED STATES PATENTS

| | | |
|---|---|---|
| 172,163 | Peebles | Jan. 11, 1876 |
| 375,070 | Jackson | Dec. 20, 1887 |
| 2,584,418 | Branson | Feb. 5, 1952 |
| 2,615,675 | Mellert | Oct. 28, 1952 |
| 2,704,548 | Ralston | Mar. 22, 1955 |
| 2,704,552 | Verteuil | Mar. 22, 1955 |
| 2,767,734 | Anderson | Oct. 23, 1956 |
| 2,827,076 | Obermaier | Mar. 18, 1958 |

FOREIGN PATENTS

| | | |
|---|---|---|
| 454,148 | Great Britain | Sept. 21, 1936 |